United States Patent [19]
Clinard et al.

[11] Patent Number: 5,743,362
[45] Date of Patent: Apr. 28, 1998

[54] TEMPERATURE COMPENSATED VISCOUS DAMPER

[75] Inventors: R. Leon Clinard, Gatzville; Peter M. Jurns, Cheektowaga, both of N.Y.

[73] Assignee: Enidine Incorporated, Orchard Park, N.Y.

[21] Appl. No.: 671,690

[22] Filed: Jun. 28, 1996

[51] Int. Cl.⁶ .................................................. F16F 15/03
[52] U.S. Cl. .............................................. 188/277; 188/276
[58] Field of Search ................................ 188/266, 267; 74/5.5

[56] References Cited

U.S. PATENT DOCUMENTS

| | | | |
|---|---|---|---|
| 3,006,441 | 10/1961 | Bliven et al. | 188/277 |
| 3,070,192 | 12/1962 | Barkalow . | |
| 3,088,555 | 5/1963 | Karlgaard | 188/276 |
| 3,107,752 | 10/1963 | McLean | 188/276 |
| 3,418,768 | 12/1968 | Cardan . | |
| 4,369,864 | 1/1983 | de Carbon | 188/277 |
| 5,074,389 | 12/1991 | Slocum . | |
| 5,347,771 | 9/1994 | Kobori et al. . | |

FOREIGN PATENT DOCUMENTS

| 0126130 | 7/1984 | Japan | 188/277 |
|---|---|---|---|

Primary Examiner—Matthew C. Graham
Attorney, Agent, or Firm—Wall Marjama & Bilinski

[57] ABSTRACT

A damper is provided which includes a first cylinder containing a viscous fluid. The first cylinder is sealed at both ends by end plates. The first cylinder is adapted for connection to a structure such as a building or a bridge. A piston head within the first cylinder is adapted for reciprocation with respect to the first cylinder. A piston rod is connected to the piston head. The other end of the piston rod extends through the end plate and is adapted for connection to the structure. A second piston rod extends from the piston head through the second end plate. A first ring surrounds the piston head and is constructed from a material having a high coefficient of thermal expansion such as plastic. A second ring surrounds the first ring and is constructed from a material having a low coefficient of thermal expansion such as metal. The first and second rings are sized such that an annular orifice is present between the second ring and the first cylinder such that the viscous fluid can flow through the annular orifice when the piston ring reciprocates with respect to the first cylinder. The relative thickness of the high coefficient of thermal expansion ring and the low coefficient of thermal expansion ring can be varied to provide near constant energy disipation over a large change in temperature. Because the plastic ring is surrounded by a metal ring, the damper has both excellent thermal compensation properties and excellent durability.

8 Claims, 2 Drawing Sheets

5,743,362

TEMPERATURE COMPENSATED VISCOUS DAMPER

BACKGROUND OF THE INVENTION

1. Field of the Invention

This invention relates in general to apparatus for damping. More particularly, the invention relates to an improved apparatus for damping which compensates for fluctuations in temperature.

2. Discussion of the Related Art

Various types of dampers are known for converting kinetic energy to heat energy. Such dampers are used to absorb energy from shocks and vibrations. For example, in structures such as buildings, bridges and the like, when an earthquake strikes, it is desirable to have dampers connected to the structures to absorb the energy of the earthquake imparted to the structure. In one type of damper, the kinetic energy of the earthquake causes a piston to move through a cylinder containing viscous fluid. An annular orifice is provided such that the viscous fluid can flow around the moving piston to convert the kinetic energy to heat energy. It has been recognized that changes in temperature alter the viscosity of the fluid such that in relatively higher temperatures, the fluid becomes less viscous and the energy converted by the damper decreases. The variation in performance due to changes in temperature is unacceptable in many applications.

In the past, one solution to this problem has been to construct the cylinder and piston head from dissimilar materials to control the annular gap between the piston head and the cylinder bore. In these dampers, variations in temperature cause gap dimension changes which offset the effects of temperature on fluid viscosity, and, thus, damper performance. As temperature increases, the piston head, which has a higher thermal expansion coefficient than the cylinder bore, expands at a rate which is higher than the cylinder bore and, thus, decreases the annular gap. The closing of the gap offsets the reduced damping capacity of the damper, therefore maintaining a more uniform performance. The thermal compensation also works in reverse, i.e. where temperature decreases. In this case, the annular gap increases to offset the increased capacity of the damper at low temperatures. This type of temperature compensating damper uses dissimilar metals for the piston head and the cylinder such as bronze for the piston head and steel for the cylinder. However, in many applications, dissimilar metals do not provide the appropriate coefficient of expansion to compensate for temperature induced variations.

To solve this problem, some dampers utilize plastic piston heads. Plastic has a greater coefficient of expansion than bronze. However, the use of plastic piston heads creates other problems. First, plastic is susceptible to deformation when subject to loads at elevated temperatures. This could lead to a catastrophic failure of the damper at a critical moment. Second, attaching the plastic to the piston heads presents another problem. Press fitting or pimping a plastic sleeve to a piston head does not provide adequate longitudinal shear resistance for the loads found in dampers of this type. The use of bonding agents to attach the sleeve to the piston head can provide adequate holding capacity but is expensive to manufacture. Further, in many cases, it is desirable to provide a specific coefficient of thermal expansion not available in existing materials.

Therefore, a damper is needed which overcomes the aforementioned deficiencies of such apparatus in the past.

OBJECTS AND SUMMARY OF THE INVENTION

It is, therefore, an object of the present invention to provide a temperature compensating damper which will provide consistent damping over a wide range of temperatures.

It is another object of the present invention to provide a damper which will not deform or shear at high temperatures.

It is also an object of this invention to provide a damper which is inexpensive to manufacture.

These and other objects are attained in accordance with the present invention wherein there is provided a temperature compensating damper which overcomes the problems associated with such apparatus of the past.

The damper includes a first cylinder containing a viscous fluid. The first cylinder is sealed at both ends by end plates and is adapted for connection to a structure such as a building or a bridge. A piston head within the first cylinder is adapted for reciprocation with respect to the first cylinder. A piston rod is connected to the piston head at one end and to a mounting clevis or spherical bearing at the other end which is adapted for connection to the structure. A second piston rod extends from the piston head. The first and second piston rods extend through the end plates. A seal is formed between the piston rods and the end plates to prevent leakage of the viscous fluid from the cylinder.

The piston head is surrounded by two rings. A first ring surrounds the piston head and is constructed from a material having a relatively high coefficient of thermal expansion such as plastic. A second ring surrounds the first ring and is constructed from a material having a relatively low coefficient of thermal expansion such as steel. The first and second rings are sized such that an annular orifice is present between the second ring and the first cylinder such that the viscous fluid can flow through the annular orifice when the piston head reciprocates with respect to the first cylinder. The metal second ring protects the first plastic ring from damage. The plastic first ring expands and contracts in conjunction with the metal second ring to control the flow of the viscous fluid through the annular orifice. This in turn regulates the energy generated by the damper. By adjusting the relative thickness of the first and second rings, the expansion of the piston head can be adjusted to compensate for a wide range of temperature variation. The inner ring is protected from the wear and stresses to which the outer ring is subjected.

Preferably, a piston sleeve with a diameter greater than the diameter of the cylinder surrounds the first piston rod and the cylinder to protect the first piston rod and seal from the environment. The piston sleeve is adapted for reciprocation with respect to the first cylinder. Preferably, a protective cylinder surrounds the second piston rod to protect the piston rod and seal from the environment.

An accumulator with a second piston and second cylinder is provided which is in fluid communication with the first cylinder and is adapted to deliver viscous fluid to the first cylinder to maintain a substantially constant static pressure in the first cylinder. A spring acts on the second piston to exert a force on the second piston to deliver viscous fluid to the first cylinder. The second piston has a piston rod attached thereto which extends through the second cylinder such that the volume of fluid in the accumulator can be determined by the position of the piston rod with respect to the second cylinder.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein.

DETAILED DESCRIPTION OF A PREFERRED EMBODIMENT

Figure 1:
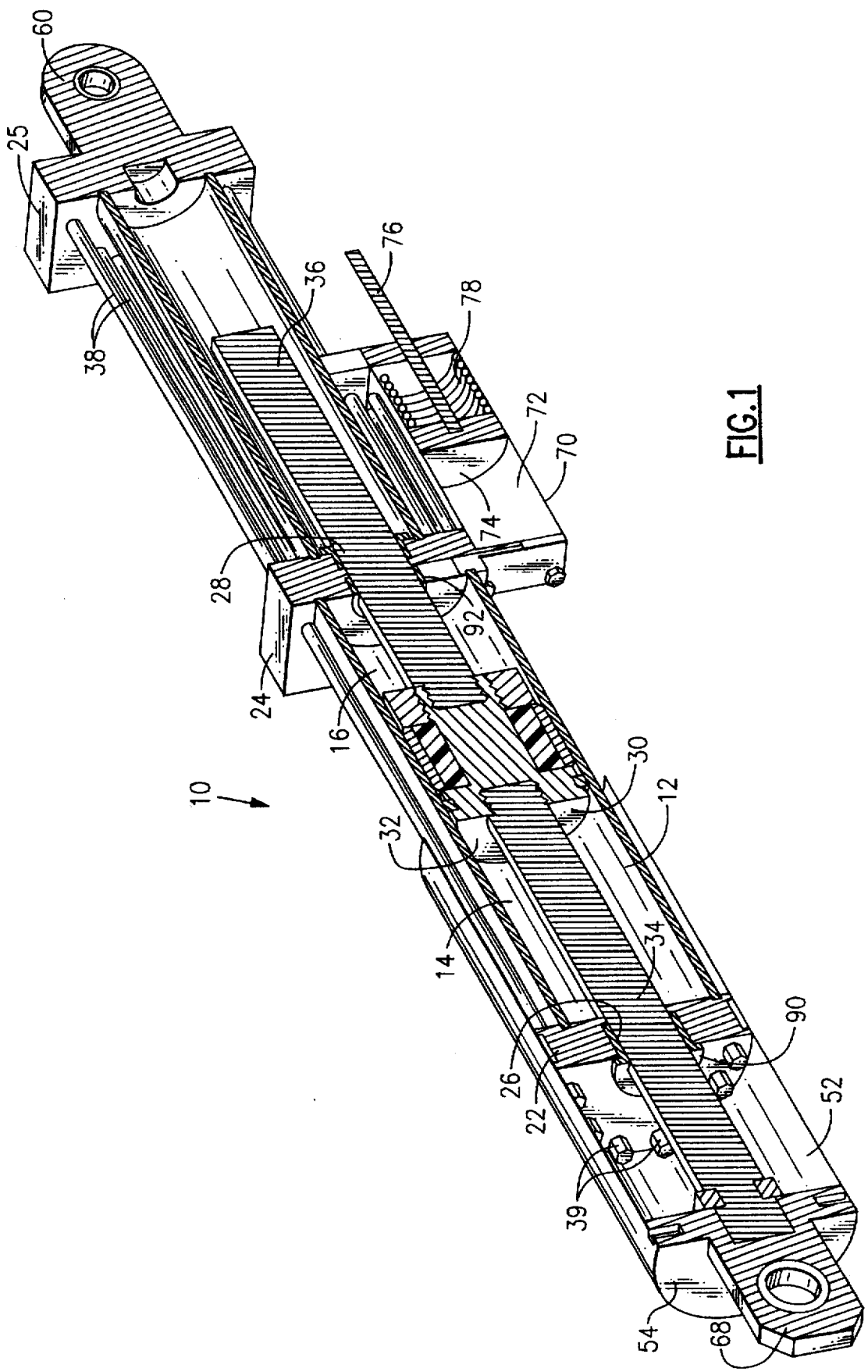
FIG. 1 is a cross-sectional perspective view of the damper of the present invention.
Figure 2:
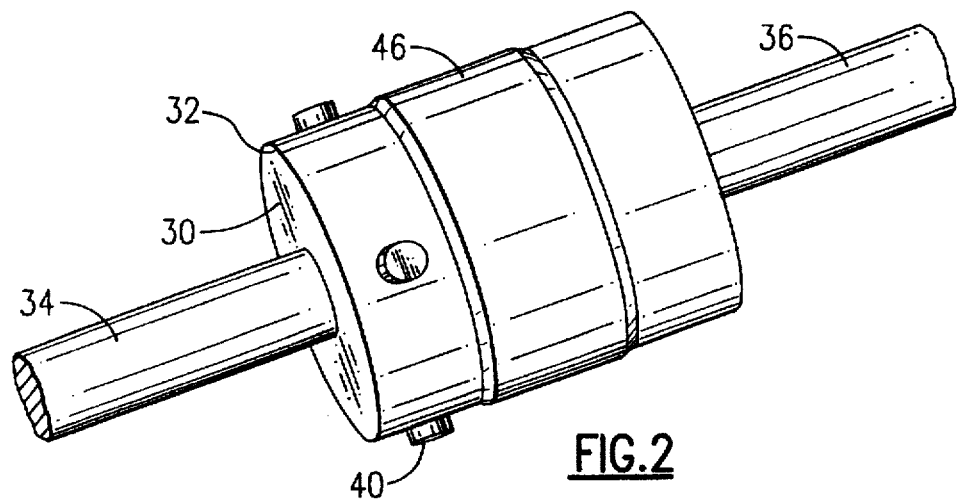
FIG. 2 is a perspective view of the piston of the present invention.

Referring now to the drawings, which are for the purpose of illustrating the preferred embodiment of the invention and not for the purpose of limiting the same, FIGS. 1–4 show the temperature compensating damper 10 of the present invention. The damper 10 includes, generally, a cylinder 12, a piston 30 and an accumulator 70.

With reference to FIG. 1, the cylinder 12 is divided into two sections 14 and 16 by piston head 32. The cylinder 12 has end plates 22 and 24 and an end cap 25. End plates 22 and 24 have bores 26 and 28 therethrough, respectively. A plurality of bars 38 extend from end cap 25 through end plate 24 and into end plate 22. A plurality of nuts 39 are threaded onto bars 38 to hold bars 38 in place and to rigidly attach end plates 22 and 24 to end cap 25. Attached to one side of the piston head 32 is a first piston rod 34 which extends through bore 26. Attached to the opposite side of the piston head 32 is a second piston rod 36 which extends through bore 28. The bores 26 and 28 are sealed by seals 90 and 92 so that fluid inside the cylinder 12 will not leak out of the bores 26 and 28. Other damper configurations may be utilized without effecting the performance of the temperature compensating device.

The piston head 32 is surrounded by a first annular ring 44 constructed from a material with a high coefficient of thermal expansion such as polyethermide resin available from GE Plastics under the trademark Ultem 1000 or Rulon available from the Advanced Polymers Division of Furon in Bristol, R.I. The first annular ring 44 is surrounded by a second annular ring 46 constructed from a material having a relatively low coefficient of thermal expansion such as steel, aluminum, brass or bronze. We have found that the following ranges of thermal expansion coefficients, in in/in/°F., work well:

| Material | Thermal Expansion Coefficient |
| --- | --- |
| Aluminum | $12.0 \times 10^{-6}$ to $13.5 \times 10^{-6}$ |
| Brass | $11.0 \times 10^{-6}$ to $12.0 \times 10^{-6}$ |
| Steel | $8.1 \times 10^{-6}$ |
| Rulon | $4.0 \times 10^{-5}$ to $6.0 \times 10^{-5}$ |
| Ultem | $3.5 \times 10^{-5}$ |

The combination of inner and outer rings should yield a net thermal expansion coefficient in the range of $1.5 \times 10^{-5}$ to $3.0 \times 10^{-5}$. Aluminum and Ultem plastic are the preferred materials for the outer and inner rings, respectively.

The annular rings 44 and 46 are sized such that an annular orifice 50 is formed between the second annular ring 46 and the cylinder 12. The cylinder is filled with a viscous fluid (not shown) such as water, hydraulic fluid or silicone. If desired, guide pins 40 can be utilized to ensure that the piston head 32 remains centered.

A piston sleeve 52 surrounds the piston rod 34 to protect the piston rod and seal 90 from the environment. The piston sleeve 52 is adapted to move over the cylinder 12. The piston sleeve 52 terminates at end cap 54. The piston rod 34 is attached to end cap 54. The end caps 54 and 25 each have a mounting clevis 58 and 60, respectively, attached thereto such that the damper can be mounted to a structure such as a bridge or building (not shown).

The accumulator 70 is mounted to the cylinder 12. The accumulator 70 includes a cylinder 72 and a piston 74. A piston rod 76 is mounted to the piston 74. The piston 74 is biased by a spring 78. Cylinder 72 accumulates excess viscous fluid through an inlet port (not shown) from the cylinder 12. An outlet port (not shown) in the accumulator allows the viscous fluid to flow from the accumulator 70 to the cylinder 12. Because the piston 74 is spring biased, the accumulator 70 maintains a substantially constant static pressure of viscous fluid in the cylinder 12.

In operation, the mounting clevis 60 of the damper 10 attaches to a structure (not shown) such as a bridge tower and the mounting clevis 58 attaches to the bridge span. When energy is imparted to the bridge, such as from an earthquake, part of the structure will move with respect to other parts of the structure. When this occurs, the motion is transferred to the damper 10. As this occurs, the piston 30 moves within the cylinder 12 through the viscous fluid. The viscous fluid is forced through the annular orifice 50 and the kinetic energy of the movement of the structure is converted to thermal energy.

Figure 3:
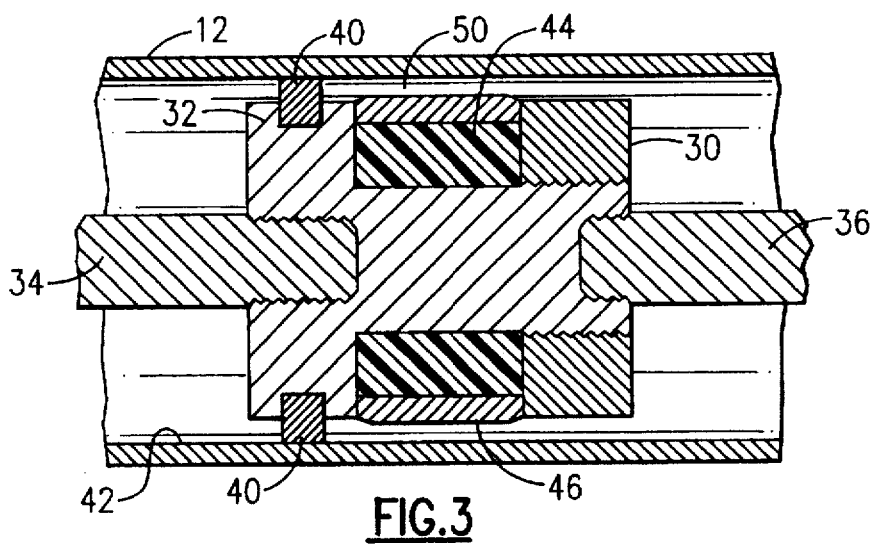
FIG. 3 is a cross-sectional view of the damper of the present invention shown at one temperature.
Figure 4:
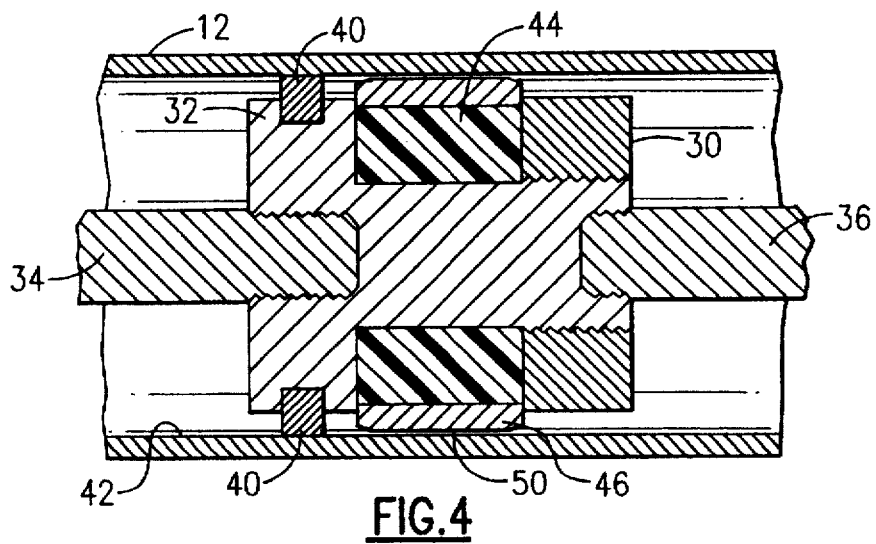
FIG. 4 is a cross-sectional view of the damper of the present invention shown at a temperature higher than the temperature shown in FIG. 3.

The damper 10 is designed to have consistant damping properties over a wide range of operating temperatures. As the operating temperature increases, the viscosity of the fluid in the cylinder 12 decreases. Without compensation, this would cause the damper 10 to convert less energy than when operating at cooler temperatures. However, as the working temperature increases (FIG. 4), the first ring 44 expands. The expansion of the first ring 44 causes the second ring 46 to expand at a higher rate than would otherwise be realized. The expansion of the rings 44 and 46 causes the size of the annular orifice 50 to decrease. Due to the reduced size of the annular orifice 50, more energy is converted by the movement of the fluid through the orifice than would be had the annular orifice 50 remained unchanged. When the working temperature decreases, the opposite occurs (FIG. 3). The fluid becomes less viscous. To compensate, the rings 44 and 46 decrease in diameter and, thus, enlarge the size of the annular orifice. Therefore, the expansion and contraction of the rings 44 and 46 compensate for the changes in the viscosity of the viscous fluid.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A temperature compensating damper for absorbing energy imparted to a structure, comprising:

a cylinder containing a viscous fluid, said first cylinder adapted for connection to said structure;

a piston head within said cylinder, adapted for reciprocation with respect to said cylinder;

a piston rod connected to said piston head at a first end and adapted for connection to said structure at a second end;

a first plastic ring surrounding said piston head having a relatively high coefficient of thermal expansion;

a second ring surrounding said first ring having a relatively low coefficient of thermal expansion, said first and second rings sized such that an annular orifice is present between said second ring and said cylinder such that said viscous fluid can flow through said annular orifice when said piston head reciprocates with respect to said cylinder.

2. The apparatus of claim 1 wherein the energy absorbed by the damper is constant irrespective of the temperature of the damper.

3. The apparatus of claim 1 wherein said first ring is constructed of polyethermide resin.

4. The apparatus of claim 1 wherein said second ring is constructed of metal.

5. The apparatus of claim 1 wherein the first ring has an approximate thermal expansion coefficient of $3.5 \times 10^{-5}$ in/in/°F. and the second ring has an approximate thermal expansion coefficient in the range of $12.0 \times 10^{-6}$ in/in/°F.

6. The apparatus of claim 1 wherein the net thermal expansion coefficient is in the range of $1.5 \times 10^{-5}$ to $3.0 \times 10^{-5}$ in/in/°F.

7. A temperature compensating damper for absorbing energy that includes a cylinder containing a fluid and a piston head that is adapted for reciprocation within said cylinder, a piston rod connected at one end to said piston head and at the other end to a structure, a first non-metallic ring surrounding the piston head, said first non-metallic ring having a relatively high coefficient of thermal expansion, and a second metallic ring surrounding the first ring having a relatively low coefficient of thermal expansion, said rings being sized such that an annular orifice is present between said second ring and said cylinder such that fluid contained in said cylinder flows through said orifice when the piston moves within the cylinder.

8. The apparatus of claim 7 wherein the net thermal expansion coefficient is in the range of $1.5 \times 10^{-5}$ to $3.0 \times 10^{-5}$ in/in/°F.

* * * * *